United States Patent
Suzuki et al.

(10) Patent No.: US 10,073,609 B2
(45) Date of Patent: Sep. 11, 2018

(54) INFORMATION-PROCESSING DEVICE, STORAGE MEDIUM, INFORMATION-PROCESSING METHOD AND INFORMATION-PROCESSING SYSTEM FOR CONTROLLING MOVEMENT OF A DISPLAY AREA

(71) Applicant: NINTENDO CO., LTD., Kyoto (JP)

(72) Inventors: Ichiro Suzuki, Kyoto (JP); Wataru Tanaka, Kyoto (JP); Seita Inoue, Kyoto (JP); Ryota Oiwa, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 379 days.

(21) Appl. No.: 13/749,065

(22) Filed: Jan. 24, 2013

(65) Prior Publication Data

US 2014/0115532 A1  Apr. 24, 2014

(30) Foreign Application Priority Data

Oct. 23, 2012 (JP) .................................. 2012-234077

(51) Int. Cl.
*G06F 3/0484* (2013.01)
*G06F 3/0488* (2013.01)
(Continued)

(52) U.S. Cl.
CPC .......... *G06F 3/0488* (2013.01); *G06F 3/0485* (2013.01); *G06F 3/0486* (2013.01)

(58) Field of Classification Search
CPC ............ G06T 2210/36; G06F 3/04815; G06F 2203/04805; G06F 2203/04806; G06F 3/0485; G06F 3/0482; G06F 3/048
(Continued)

(56) References Cited

U.S. PATENT DOCUMENTS 8,205,157 B2 * 6/2012 Van Os ................. G06F 3/0488
715/702
8,762,840 B1 * 6/2014 Gouglev ............... G06F 3/0485
345/173

(Continued)

FOREIGN PATENT DOCUMENTS

| EP | 2 418 571 | 2/2012 |
|---|---|---|
| JP | 2010-515978 | 5/2010 |
| JP | 2012-150558 | 8/2012 |

OTHER PUBLICATIONS

European Search Report dated Aug. 3, 2016 issued in corresponding European Application No. 13152137.9 (10 pages).

*Primary Examiner* — Sang H Kim
(74) *Attorney, Agent, or Firm* — Nixon & Vanderhye PC

(57) ABSTRACT

An exemplary information-processing device includes: an operation receiving unit that receives an operational input made by a user for moving a display area that has area that overlaps with a predetermined area; a display controlling unit that controls a display unit to display a graphic in the display area; a determining unit that determines a velocity of movement of the display area in accordance with a value derived from the operational input, and; an area managing unit that manages the display area to move the display area at the velocity of movement under a condition that, when a portion of the display area moves outside a predetermined portion of the predetermined area, a distance between the display area and the predetermined area does not exceed a threshold.

30 Claims, 10 Drawing Sheets

(51) Int. Cl.
  *G06F 3/0485*  (2013.01)
  *G06F 3/0486*  (2013.01)
(58) Field of Classification Search
  USPC .......................................................... 715/790
  See application file for complete search history.

(56) References Cited

U.S. PATENT DOCUMENTS

| | | | | |
|---|---|---|---|---|
| 2001/0045965 | A1* | 11/2001 | Orbanes | G06F 3/0346 715/841 |
| 2008/0168384 | A1* | 7/2008 | Platzer | G06F 3/04845 715/784 |
| 2008/0168404 | A1 | 7/2008 | Ording | |
| 2009/0228825 | A1* | 9/2009 | Van Os | G06F 3/0488 715/780 |
| 2009/0327886 | A1* | 12/2009 | Whytock | G06F 3/0421 715/702 |
| 2011/0010659 | A1* | 1/2011 | Kim | G06F 3/0485 715/784 |
| 2011/0072394 | A1* | 3/2011 | Victor | G06F 3/0482 715/821 |
| 2011/0074699 | A1* | 3/2011 | Marr | G06F 3/0485 345/173 |
| 2012/0062604 | A1* | 3/2012 | Lobo | G06F 3/0485 345/684 |
| 2012/0069131 | A1* | 3/2012 | Abelow | G06Q 10/067 348/14.01 |
| 2012/0072870 | A1* | 3/2012 | Akifusa | G06F 3/0482 715/830 |
| 2012/0182324 | A1* | 7/2012 | Yano | G06F 3/0485 345/684 |
| 2012/0266109 | A1 | 10/2012 | Lim et al. | |
| 2012/0272181 | A1* | 10/2012 | Rogers | G06F 3/0482 715/784 |
| 2013/0067395 | A1* | 3/2013 | Nishina | G06F 3/0485 715/784 |
| 2014/0040798 | A1* | 2/2014 | Kodosky | G06F 3/0481 715/765 |
| 2014/0146075 | A1* | 5/2014 | Takasu | G02B 27/017 345/619 |
| 2015/0143284 | A1* | 5/2015 | Bennett | G06F 3/0484 715/790 |

* cited by examiner

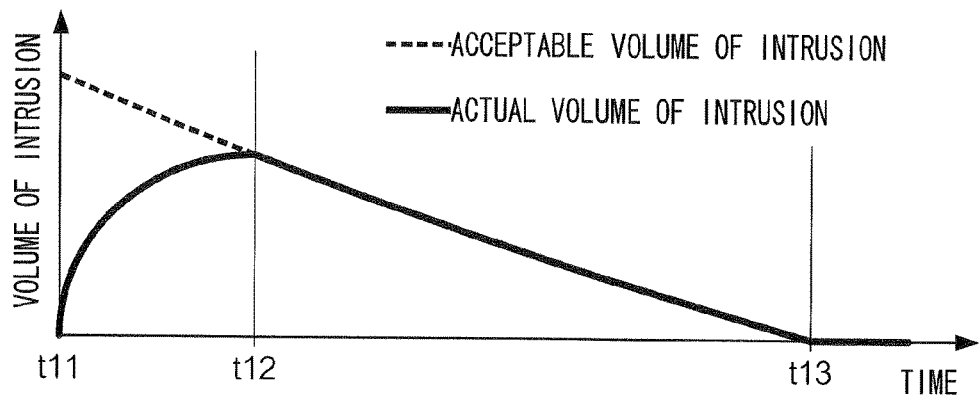
FIG. 13A
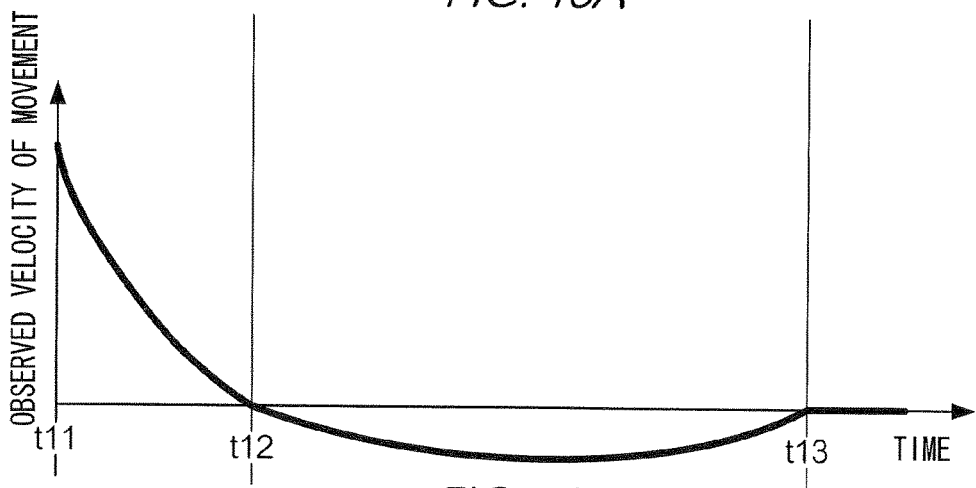
FIG. 13B
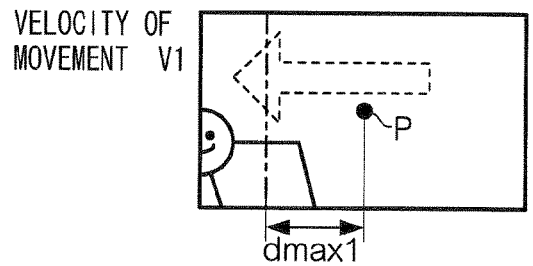
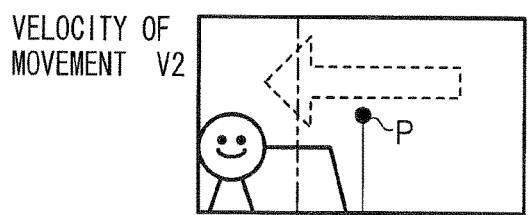
FIG. 14     $V1 > V2 \rightarrow dmax1 \geqq dmax2$

INFORMATION-PROCESSING DEVICE, STORAGE MEDIUM, INFORMATION-PROCESSING METHOD AND INFORMATION-PROCESSING SYSTEM FOR CONTROLLING MOVEMENT OF A DISPLAY AREA

CROSS REFERENCE TO RELATED APPLICATIONS

This application is based on and claims priorities under 35 USC 119 from Japanese patent application No. 2012-234077, which was filed on Oct. 23, 2012.

FIELD

This application relates to a user interface.

BACKGROUND AND SUMMARY

There exist in the art technologies for displaying graphics that show objects scrolled in a frame.

The present disclosure provides a user with a feeling of comfort in operating a user interface.

There is provided an information-processing device comprising: an operation receiving unit that receives an operational input made by a user for moving a display area that has an area that overlaps with a predetermined area, a display controlling unit that controls a display unit to display a graphic in the display area, a determining unit that determines a velocity of movement of the display area in accordance with a value derived from the operational input, and an area managing unit that manages the display area to move at the velocity of movement under a condition that, when a portion of the display area moves outside a predetermined portion of the predetermined area, a distance between the display area and the predetermined area does not exceed a threshold.

BRIEF DESCRIPTION OF THE DRAWINGS

Exemplary embodiments will be described with reference to the following drawings, wherein:

FIGS. 5A and 513 show examples of distances between area 53 and freely-movable portion 54;

FIGS. 13A and 13B show examples of a change of velocities of movement s after intrusion starts;

FIG. 14 shows examples of a maximum volume of intrusion; and

DETAILED DESCRIPTION OF NON-LIMITING EXEMPLARY EMBODIMENTS

1. Overview

Figure 1:
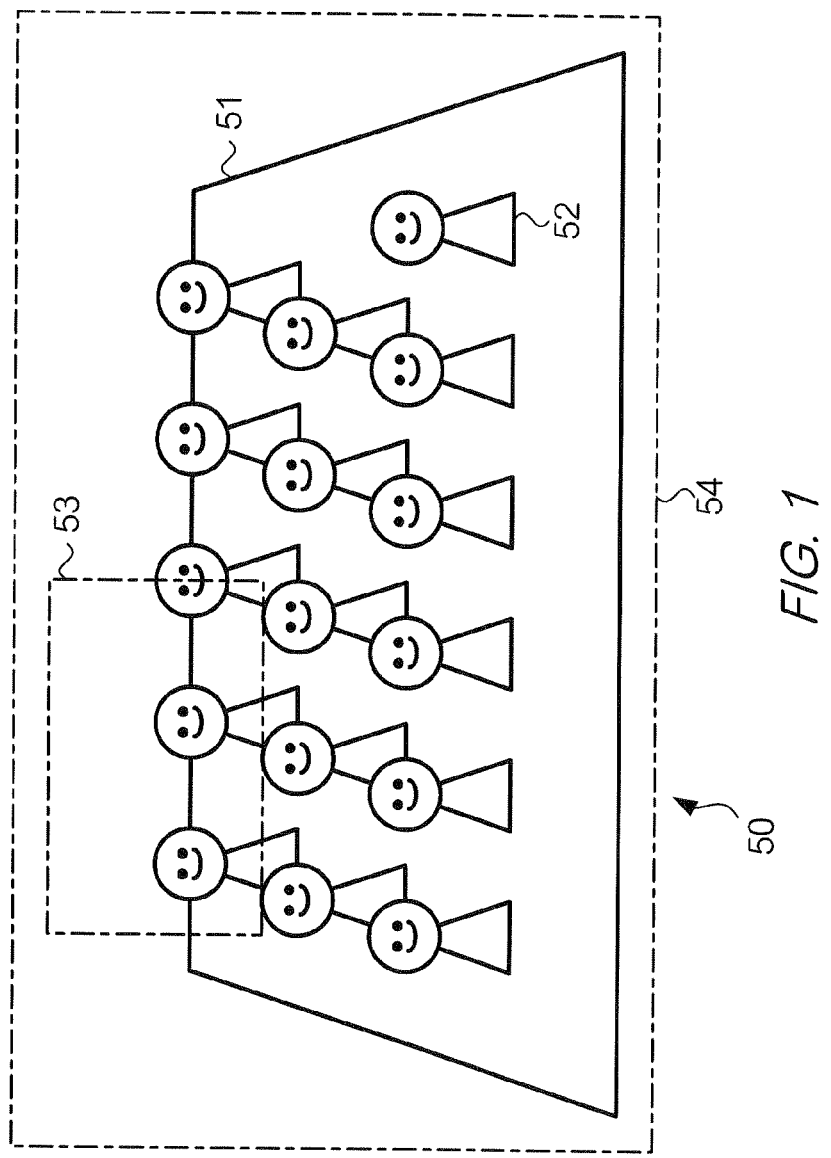
FIG. 1 shows an example of virtual space 50 in an exemplary embodiment.

FIG. 1 is a diagram illustrating an example of virtual space 50 in an exemplary embodiment. Virtual space 50 is a three-dimensional virtual space. Virtual space 50 contains field 51 and objects 52. Field 51 is a virtual plane on which objects are set up in the virtual space. Objects 52 are virtual objects set up in the virtual space, and they may include various sorts of objects that include at least one character object such as a human, animal, monster, etc., an architecture object such as a house, tower, castle, etc., a nature object such as a mountain, river, tree, rock, etc., and an artificial object that is not fixed to the field such as automobile, brick, etc. In the example illustrated in FIG. 1, plural character objects are set up as objects 52.

A virtual camera (not shown in the figure) is set up in virtual space 50, and graphics shot virtually by the virtual camera are displayed by a display unit. Area 53 is the area shot by the virtual camera, and area 53 is displayed by display unit 20. Area 53 may move in accordance with operational inputs made by a user. More concretely, graphics displayed by display unit 20 may be scrolled in response to the user's operational inputs. Freely-movable portion 54 is set to area 53. Area 53 may move freely in response to operations made to the virtual camera when a predetermined particular point, such as the center point of area 53 and a point at an edge of area 53, stays inside of freely-movable portion 54. However, once the particular point of area 53 goes outside freely-movable portion 54, movement of area 53 is more restricted than when the particular point stays inside freely-movable portion 54. It should be noted that area 53 is not totally prohibited to go outside freely-movable portion 54. Namely, at least a portion of area 53 is allowed to go outside freely-movable portion 54 under predetermined conditions. Freely-movable portion 54 actually has a three-dimensional shape, but is illustrated in FIG. 1 simply in a two-dimension manner.

Figure 2A:
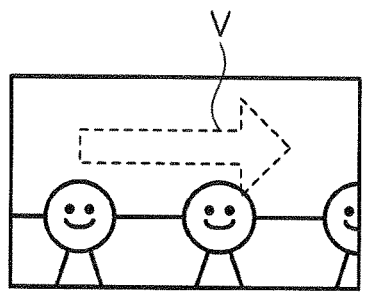
FIGS. 2A-2D show examples of graphics displayed by display unit 20 in a comparative example.
Figure 2B:
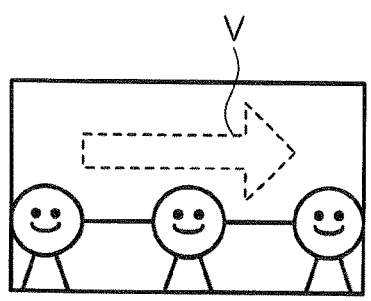
Figure 2C:
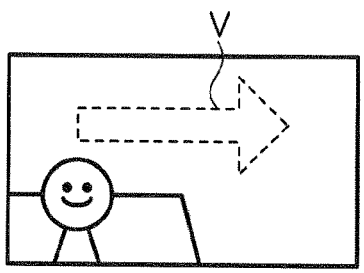
Figure 2D:
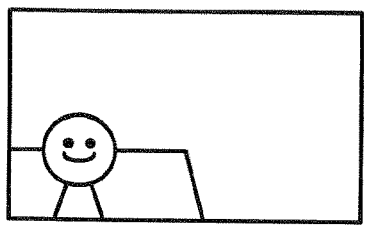

FIGS. 2A-2D show examples of graphics displayed by display unit 20 in a comparative example. Arrow V indicates a velocity of movement of area 53 or the virtual camera. In the example, area 53 moves at a velocity of movement in the rightward direction. In other words, displayed graphics are scrolled leftward. The velocity of movement is determined in accordance with operational inputs made by the user. In response to the operational inputs, graphics displayed by the display unit continuously change from graphic FIG. 2A to FIG. 2B, and to FIG. 2C. FIG. 2C shows a situation in which the right edge of area 53 reaches the right side of freely-movable portion 54 and they overlap with each other. In the comparative example, under the situation shown by FIG. 2C, area 53 cannot further move in the rightward direction, even if, for example, operational inputs are made for letting area 53 move in the rightward direction and a virtually calculated velocity of movement in the rightward direction is given to area 53, as shown by graphic FIG. 2D. In this situation, the user finds it difficult to determine why area 53 cannot further move in the rightward direction, namely, because area 53 has reached the edge of freely-movable portion 54 or because an operational error has occurred in the device.

Figure 3A:
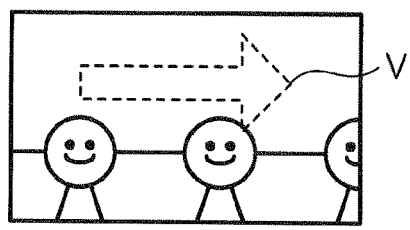
FIGS. 3A-3E show examples of graphics displayed by display unit 20 in the exemplary embodiment.
Figure 3B:
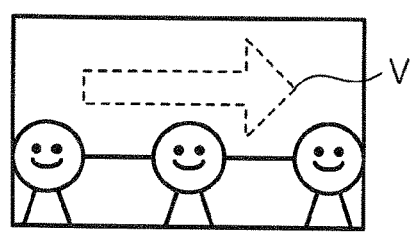
Figure 3C:
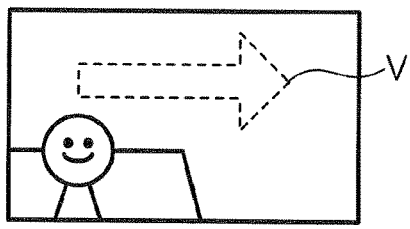
Figure 3D:
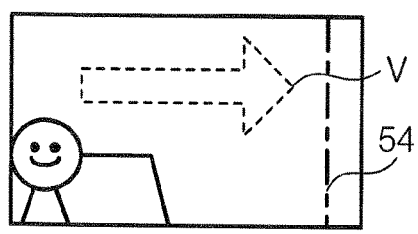
Figure 3E:
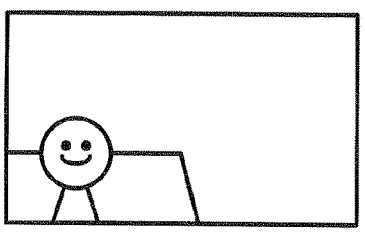

FIGS. 3A-3E show examples of graphics displayed by display unit 20 in the exemplary embodiment. Graphics of FIG. 3A to FIG. 3C are identical to graphics of FIG. 2A to FIG. 2C, respectively. Under the situation shown by graphic FIG. 3C, namely, when the particular point of area 53 reaches the right side of freely-movable portion 54, the particular point of area 53 is allowed to move beyond the right side of freely-movable portion 54 in the rightward direction if a velocity of movement in the rightward direction is given to area 53, as shown by graphic FIG. 3D. After the particular point moves beyond the right side of freely-movable portion 54 and keeps moving rightward for a certain distance, the particular point stops moving in the direction, and starts moving in the opposite direction to move back to freely-movable portion 54. When the particular point such as a point on the right edge of area 53 reaches the right side of freely-movable portion 54, area 53 stops moving and maintains its position, as shown by graphic FIG. 3E. In this example, the user can intuitively recognize that area 53 reaches the border of freely-movable portion 54. In the following paragraphs, configurations and operations of a device that provides a user interface behaving in the above-explained manner are explained.

2. Configuration

Figure 4:
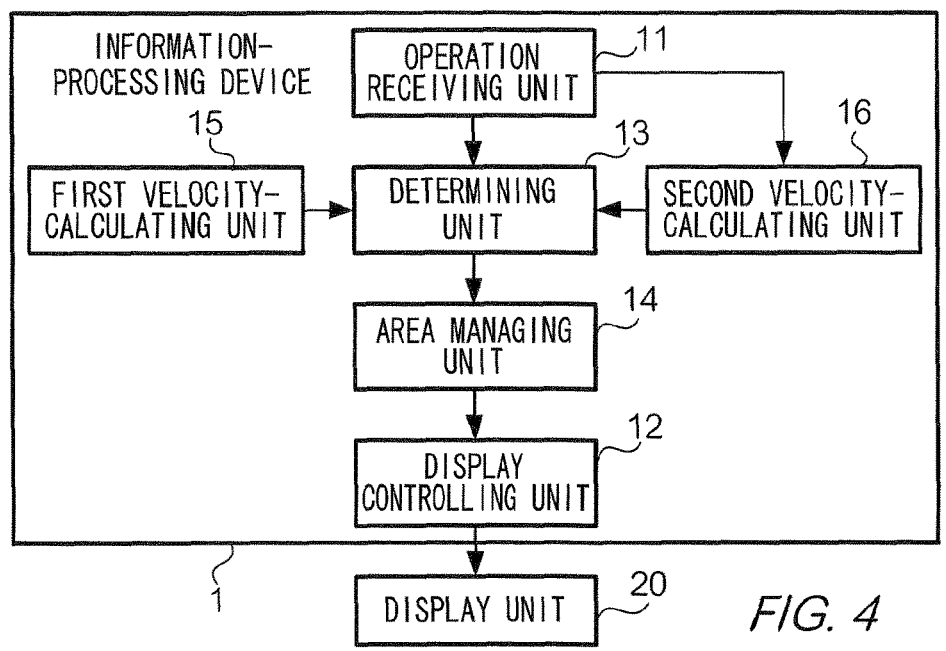
FIG. 4 shows an example of a functional configuration of information-processing device 1 of the exemplary embodiment.

FIG. 4 is a diagram illustrating a functional configuration of information-processing device 1 of the exemplary embodiment. Information-processing device 1 has operation receiving unit 11, display controlling unit 12, determining unit 13, and area managing unit 14. Operation receiving unit 11 receives operational inputs made by the user for moving area 53 in a predetermined area, i.e. virtual space 50 in this case. Display managing unit 12 instructs display unit 20 to display graphics positioned in area 53 of virtual space 50. Display unit 20 is a functional component that displays at least one of letter and image, and in this exemplary embodiment, display unit 20 is realized by a device different from information-processing device 1. Determining unit 13 determines a velocity of movement of area 53 in virtual space 50 based on values in accordance with operational inputs made by the user. Area managing unit 14 moves graphics displayed by display unit 20 at the velocity of movement. In this exemplary embodiment, when the display area goes outside of the predetermined portion of virtual space 50, i.e. freely-movable portion 54 in this case, area managing unit 14 moves area 53 under the condition that a distance between area 53 and freely-movable portion 54 does not exceed a threshold, i.e. an upper limit.

Figure 5A:
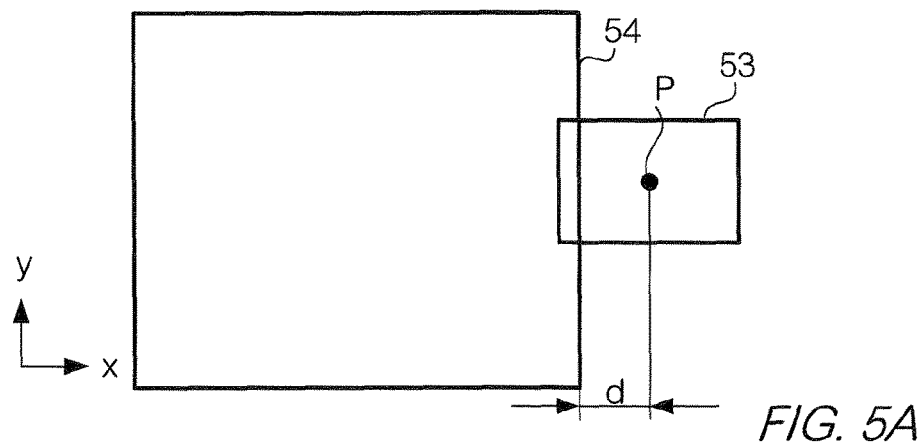
Figure 5B:
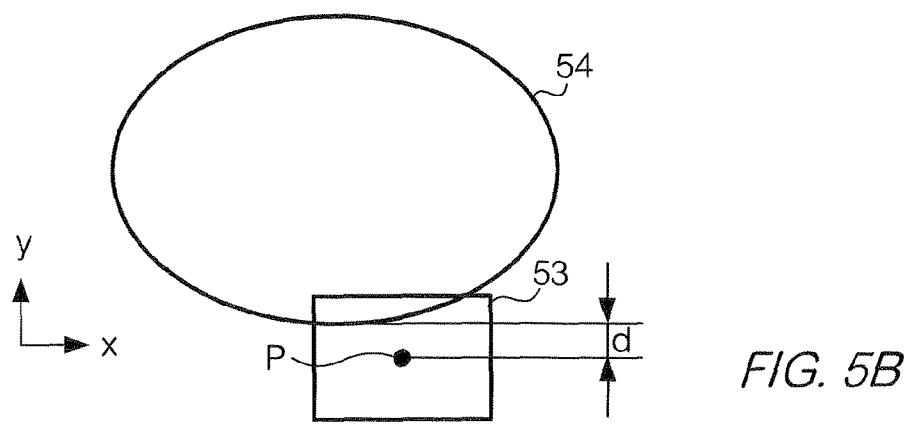

FIGS. 5A and 5B show examples of distances between area 53 and freely-movable portion 54. In the examples, the distance between area 53 and freely-movable portion 54 is defined as a distance between particular point P of area 53 and an edge of freely-movable portion 54. More concretely, the distance is defined as a difference between a coordinate value of particular point P in a direction of a certain coordinate axis and the maximum (or minimum) coordinate value of freely-movable portion 54 in the direction of the certain coordinate axis. In the examples, particular point P of area 53 is the center point of area 53. In the example shown by FIG. 5A, particular point P goes beyond freely-movable portion 54 in the positive direction of x-axis, and a difference between x-coordinate value of particular point P and the maximum x-coordinate value of freely-movable portion 54 is defined as distance d between particular point P and freely-movable portion 54. FIG. 5B illustrates an example where the shape of freely-movable portion 54 is not a rectangle. In this example, particular point P goes beyond freely-movable portion 54 in the negative direction of y-axis, and a difference between y-coordinate value of particular point P and the minimum y-coordinate value of freely-movable portion 54 is defined as distance d between particular point P and freely-movable portion 54. In the following explanation, the distance between area 53 and freely-movable portion 54 is referred to as a "volume of intrusion" since the distance indicates how much area 53 intrudes the outside of freely-movable portion 54. It should be noted that the particular point of area 53 is not limited to the center point of area 53, and any point that specifies the position of area 53 may be used as the particular point. When the center point of area 53 is used as the particular point, freely-movable portion 54 is the portion that is a certain length (a half length of height of area 53 in vertical direction and a half length of width of area 53 in horizontal direction) smaller than the portion in which area 53 is allowed to move.

Now, explanation is continued with reference to FIG. 4. In this exemplary embodiment, information-processing device 1 further has first velocity-calculating unit 15 and second velocity-calculating unit 16. Operational inputs received by operation receiving unit 11 are sorted out in each of unit periods. Virtual space 50 is an n-dimensional (n>=1) virtual space. First velocity-calculating unit 15 calculates a first velocity in accordance with operational inputs made by the user. The first velocity is a velocity that is calculated in accordance with a total sum of values derived from operational inputs made by the user in a predetermined period in the past. Second velocity-calculating unit 16 calculates a second velocity in accordance with operational inputs made by the user. The second velocity is a velocity that is calculated based on a distance between a first point and a second point in the n-dimensional virtual space, which points are indicated by operational inputs made by the user. Determining unit 13 determines one of the first velocity and the second velocity as the velocity of movement in accordance with operational inputs made by the user.

Figure 6:
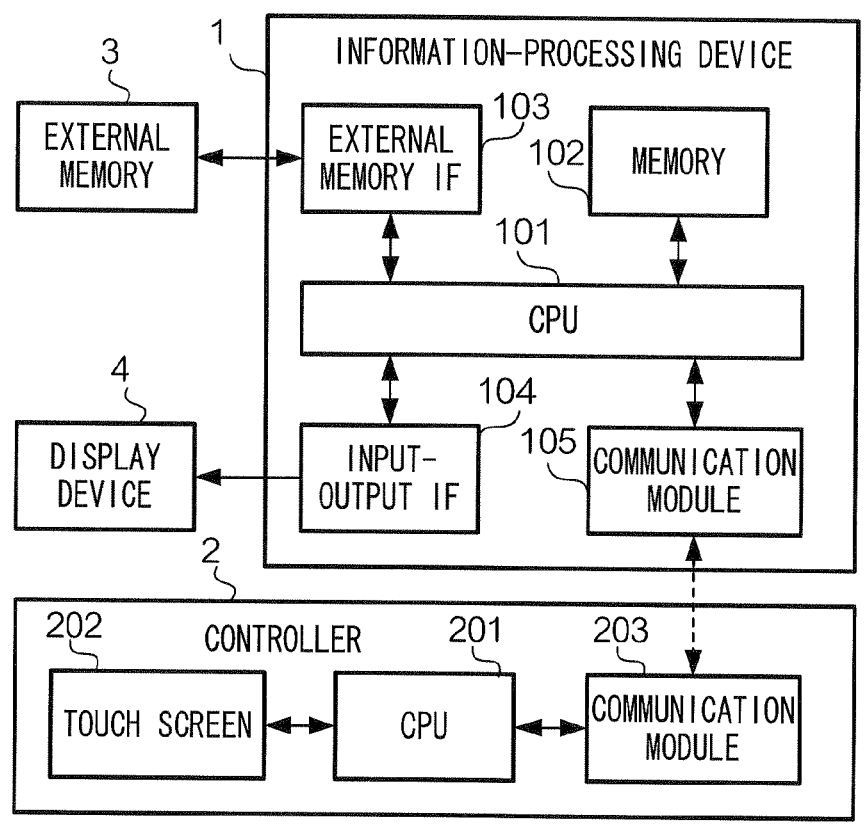
FIG. 6 shows an example of a hardware configuration of information-processing device 1.

FIG. 6 is a diagram illustrating a hardware configuration of information-processing device 1. In this exemplary embodiment, information-processing device 1 is a gaming device that provides its user with video games. Information-processing device 1 is a computer device that has CPU 101, memory 102, external memory IF 103, input-output IF 104, and communication module 105. Controller 2 is a device that is used by the user to operate information-processing device 1. Information-processing device 1 is connected to display device 4. Display device 4 is a device that displays information including at least one of a letter and an image, and it has a display, such as a liquid crystal panel, an organic EL (Electro-Luminescence) panel, etc., and a drive circuit. In this exemplary embodiment, information-processing device 1 is a stationary type of gaming device, and display device 4 is not built in to information-processing device 1. Namely, display device 4 is an external device of information-processing device 1, such as a TV set. However, information-processing device 1 may have display device 4 built in.

CPU 101 is a device that controls other components of information-processing device 1, and it carries out various sorts of computing. Memory 102 is a data storing device that stores data including programs, and has, for example, a RAM (Random Access Memory) and ROM (Read Only Memory). External memory IF 103 is an interface that reads data including programs from external memory 3 and writes data including programs to external memory 3. External memory 3 is a memory, such as an optical disc, a magnetic disc, and a semiconductor memory, that stores data such as game programs. Input-output IF 104 is an interface that communicates data with an input-output device, i.e. display device 4 in this case. Communication module 105 is a device that communicates data with controller 2, and has, for example, an antenna and an amplifier. When a program such as a game program stored by external memory 3 or memory 102 is executed, the function in accordance with the program such as a video game is realized in information-processing device 1.

Controller 2 is a device that provides information-processing device 1 with instructions. In this exemplary embodiment, controller 2 also has a function of displaying graphics in accordance with data transmitted from information-processing device 1. Controller 2 has CPU 201, touch screen 202, and communication module 203. CPU 201 is a device that controls other components of controller 2, and it carries out various sorts of computing using a memory (not shown). Touch screen 202 is a device that has both a function of displaying information and a function of receiving instructions made by a user. Touch screen 202 has, for example, a display, a drive circuit, and a touch sensor panel placed on the surface of the display. Communication module 203 is a device that communicates data with information-processing device 1, and has, for example, an antenna and an amplifier.

In this exemplary embodiment, information-processing device 1 provides a function of displaying graphics in area 53 of virtual space 50 using at least one of display device 4 and touch screen 202 by executing processing in accordance with programs such as game programs, system software, and combinations of these programs stored by external memory 3 or memory 102. Area 53 moves in virtual space 50 in accordance with operational inputs made by the user via controller 2. CPU 101 that executes the programs is an example of operation receiving unit 11, display managing unit 12, determining unit 13, area managing unit 14, first velocity-calculating unit 15, and second velocity-calculating unit 16. At least one of display device 4 and touch screen 202 is an example of display unit 20.

3. Process

Figure 7:
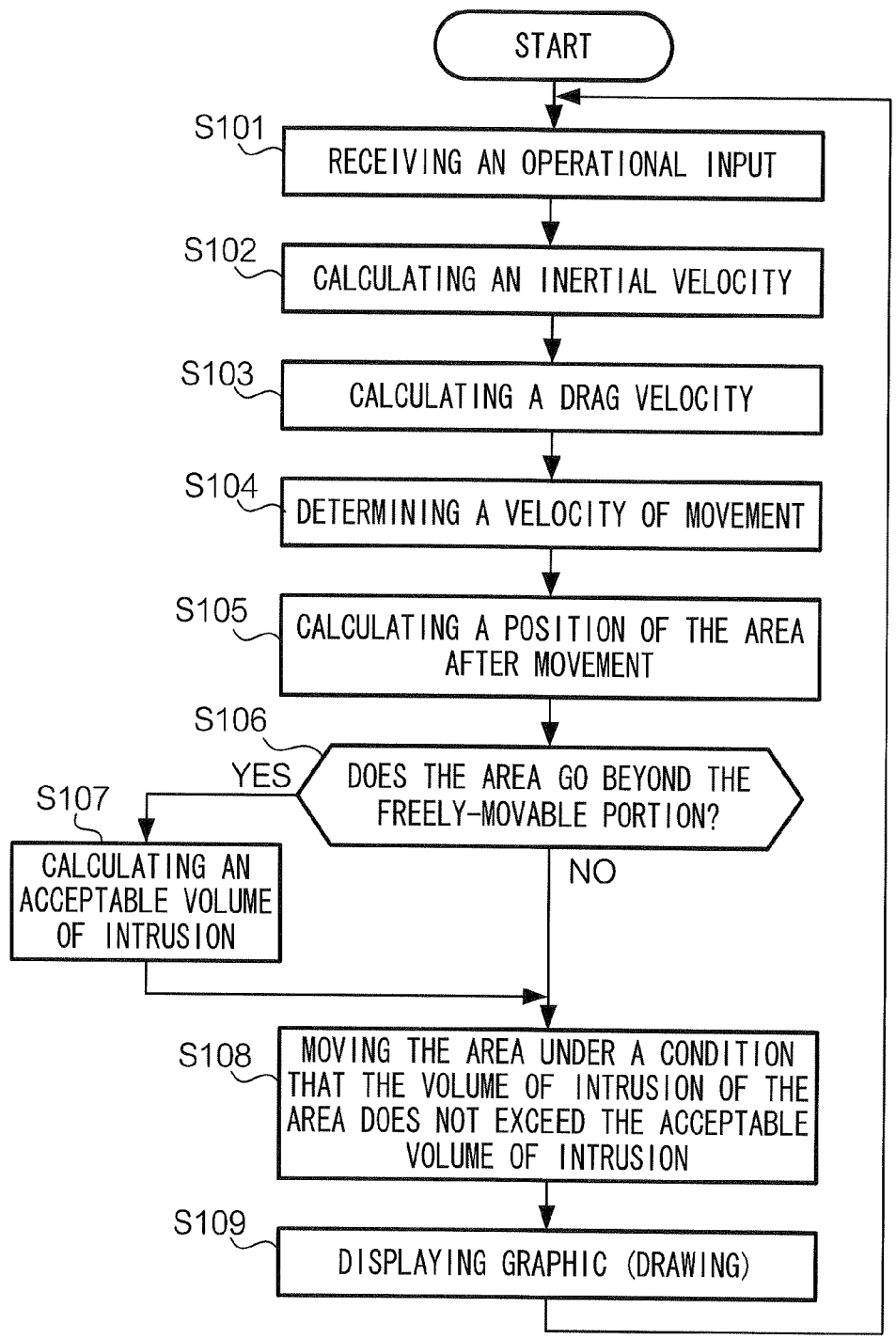
FIG. 7 shows an example of a flowchart illustrating a process conducted by information-processing device 1.

FIG. 7 is a flowchart illustrating a process conducted by information-processing device 1. When the process illustrated by FIG. 7 is carried out, a program for displaying graphics in area 53 of virtual space 50 is in execution. Now, a process that is carried out when graphics in area 53 is displayed by touch screen 202 and instructions in accordance with operational inputs made by the user to touch screen 202 are input to information-processing device 1 is explained. In this example, the process illustrated by FIG. 7 is executed repeatedly at certain fixed intervals, such as every 16.7 milliseconds, i.e. 60 Hz. In the following explanation, the fixed interval is referred to as a "frame."

The user may make operational inputs to touch screen 202 by actions called "drag" and "flick." Drag is an action for the user to slide one of his/her fingers on touch screen 202, i.e. to move a position of contact between the finger and touch screen 202 keeping the contact. Flick is an action whereby the user sweeps one of his/her fingers quickly on touch screen 202, i.e. to drag at a velocity quicker than a threshold velocity and set the finger apart from touch screen 202. In accordance with operational inputs made by these actions, the velocity of movement of area 53 is determined, and graphics in area 53 moving at the velocity of movement are displayed.

In step S101, CPU 101 receives an operational input. More concretely, the following operations are carried out. When the user operates controller 2, controller 2 outputs data in accordance with the operational input made by the user, which data is referred to as "operational input data" hereinafter. The operational input data indicates coordinates of a position in touch screen 202 at which the user's finger contacts with touch screen 202. The coordinates are referred to as "real coordinates" hereinafter. In the case where touch screen 202 is not touched by a finger of the user in the current frame, the operational input data indicates a null value. CPU 101 converts the real coordinates to coordinates indicating a point in virtual space 50. The coordinates indicating the position in virtual space 50 are referred to as "virtual coordinates" hereinafter, and a point indicated by virtual coordinates is referred to as a "virtual point" hereinafter. Since real coordinates are coordinates on touch screen 202, real coordinates are coordinates in a 2-dimensional coordinate space. On the other hand, since virtual coordinates are coordinates in virtual space 50, virtual coordinates are coordinates in a 3-dimensional coordinate space. In this example, coordinates in the 2-dimensional coordinate space are converted to coordinates in the 3-dimensional coordinate space by use of a virtual plane in virtual space 50 as a reference plane.

Figure 8:
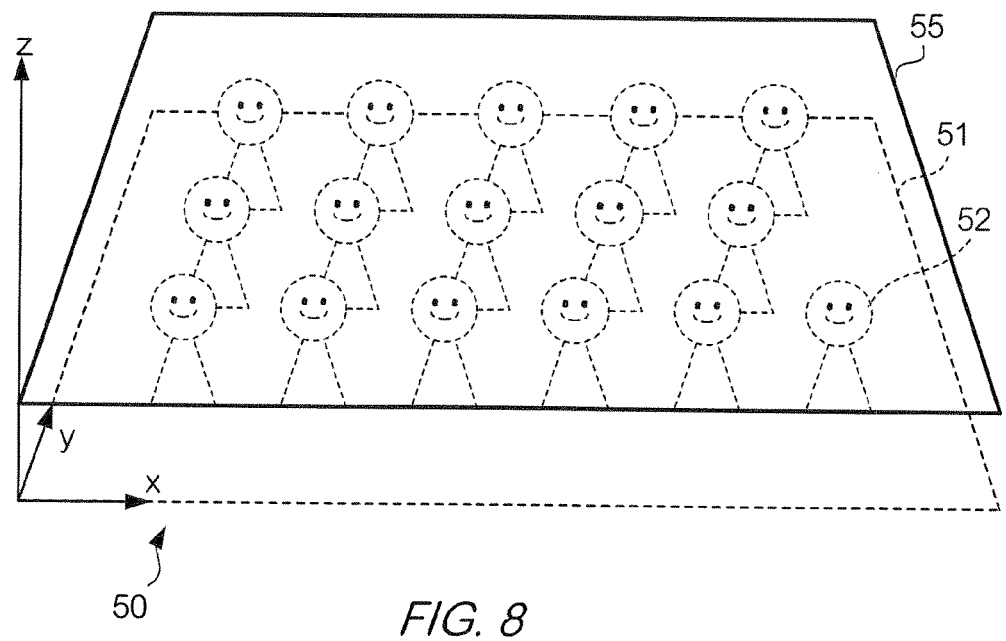
FIG. 8 shows an example of virtual plane 55 in virtual space 50.

FIG. 8 is a diagram illustrating an example of virtual plane 55 in virtual space 50. In this example, x-axis and y-axis are defined so that the plane on which objects 52 showing characters becomes x-y plane, and the height direction is defined on a z-axis. Virtual plane 55 is a plane whose z-coordinates are constant, and it is placed, for example, at the height of the characters' faces. CPU 101 converts real coordinates to virtual coordinates by use of virtual plane 55 as a reference plane. In other words, CPU 101 maps real coordinates on virtual plane 55. The conversion from 2-dimensional coordinates to 3-dimensional coordinates may alternatively be carried out in any other way than the above explained way.

Memory 102 stores virtual coordinates that indicate positions of touches made in a certain period in the past in the order of frames in which the coordinates were generated. The certain period may be, for example, a period from a frame in which the current drag or flick started to the last frame, i.e. the current frame. CPU 101 continually writes the virtual coordinates in the current frame to memory 102.

The velocity of movement of area 53 is continually calculated by use of plural sets of virtual coordinates stored by memory 102. In this exemplary embodiment, area 53 moves in accordance with two sorts of velocity of movement, i.e. inertial velocity (an example of the first velocity) and drag velocity (an example of the second velocity). CPU 101 calculates both of the inertial velocity and the drag velocity in each frame. CPU 101 adopts one of the inertial velocity and the drag velocity as the velocity of movement of area 53 in accordance with operational inputs made by the user. In the following section, the way these velocities are calculated will be explained.

The following explanation is made with reference to FIG. 7 again. In Step S102, CPU 101 calculates an inertial velocity, that is referred to as "inertial velocity Vi hereinafter. Inertial velocity Vi is calculated based on a total sum of values indicated by operational inputs made within a certain period in the past, i.e. plural sets of virtual coordinates stored by memory 102.

Figure 9:
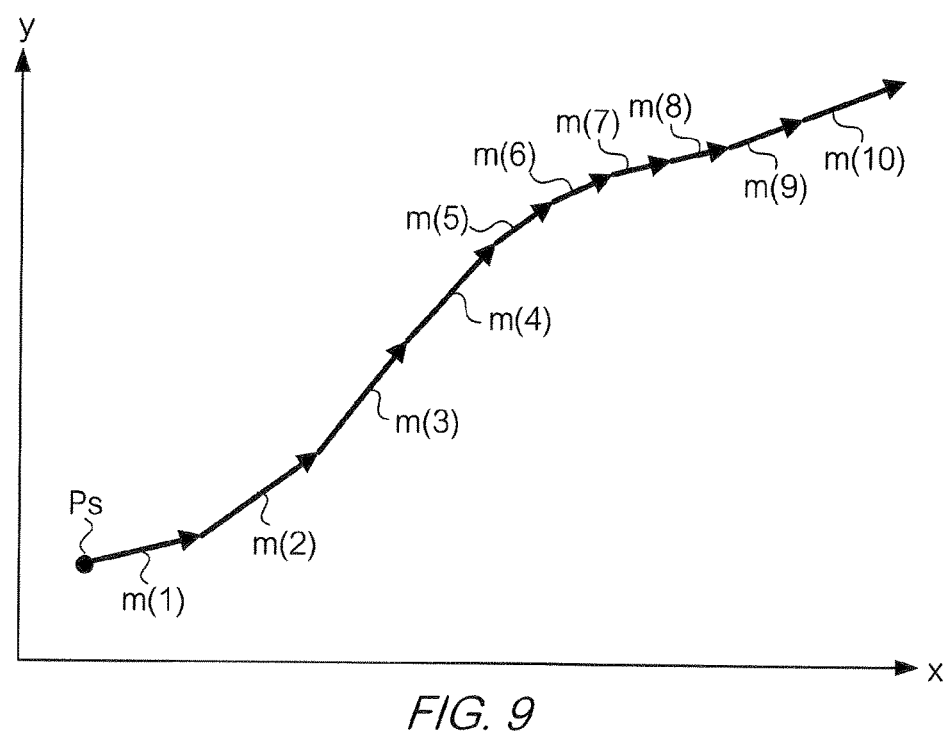
FIG. 9 shows an example of track record of values in accordance with operational inputs.

FIG. 9 is a graph illustrating an example of track record of values in accordance with operational inputs. The horizontal axis and the vertical axis in the graph correspond to x-axis and y-axis of virtual space 50 respectively. Starting point Ps corresponds to a virtual point from which the current drag starts. Vector m(j) is a vector that indicates a displacement from a position of the current drag in the (j−1)-th frame to a position of the current drag in the j-th frame. In this case, the frame in which the current drag started is defined as, for example, the 0th frame. CPU 101 calculates inertial velocity Vi(j), i.e. inertial velocity Vi in the j-th frame, in accordance with formula (1) shown below. CPU 101 writes the calculated inertial velocity Vi(j) to memory 102.

$$Vi(j)=k1\times S(j) \quad \text{Formula (1):}$$

Vector S(j) is a vector indicates the track record of operational inputs made until the j-th frame, and the vector is calculated in accordance with formula (2) shown below.

$$S(j)=k2\times S(j-1)+k3\times m(j) \quad \text{Formula (2):}$$

Coefficient k1 is a coefficient determining a correspondence relation between a value of operational input and a velocity of graphics in the screen. Coefficient k1 is, for example, more than 0 and less than 1, i.e. 0<k1<1. When area 53 stays in freely-movable portion 54, coefficient k1 is constant. When a part of area 53 goes outside freely-movable portion 54, coefficient k1 varies in accordance with a volume of intrusion of area 53. More concretely, the larger the volume of intrusion becomes, the smaller coefficient k1 becomes. Coefficient k2 is a coefficient determining virtual resistance against movement of area 53 in virtual space 50, such as air resistance against the virtual camera generated when the virtual camera moves in virtual space 50. Coefficient k2 is a constant in a range, for example, more than 0 and less than 1, i.e. 0<k2<1.

Coefficient k3 is a coefficient determining a correspondence relation between a value of operational input and a velocity of graphics on the screen. Coefficient k3 is determined based on a measure of an angle between vector m(j) and vector m(j−1). More concretely, the smaller a measure of an angle between vector m(j) and vector m(j−1) becomes, the larger coefficient k3 becomes. This is explained as follows. When the user flicks on touch screen 202, a track of moving position on which the user's finger contacted with touch screen 202 just before the finger was detached from touch screen 202 is not well controlled by the user. For example, even if the user intends to flick on touch screen 202 in the horizontal direction, at a timing when the finger is detached from touch screen 202, the finger tends to curve to the vertical side against the user's intention. Similarly to this case, when a difference between the latest vector m and its previous vector m is large, the effect of the latest operational input should be decreased, and therefore, coefficient k3 should be set as a smaller value.

FIG. 7 is referred to again. In step S103, CPU 101 calculates a drag velocity. More concretely, the following processes are performed. Drag velocity Vd is calculated based on starting point Ps and terminal point Pc. Terminal point Pc is a virtual point corresponding to a position at which the user's finger contacts with touch screen 202 in the latest frame.

Figure 10:
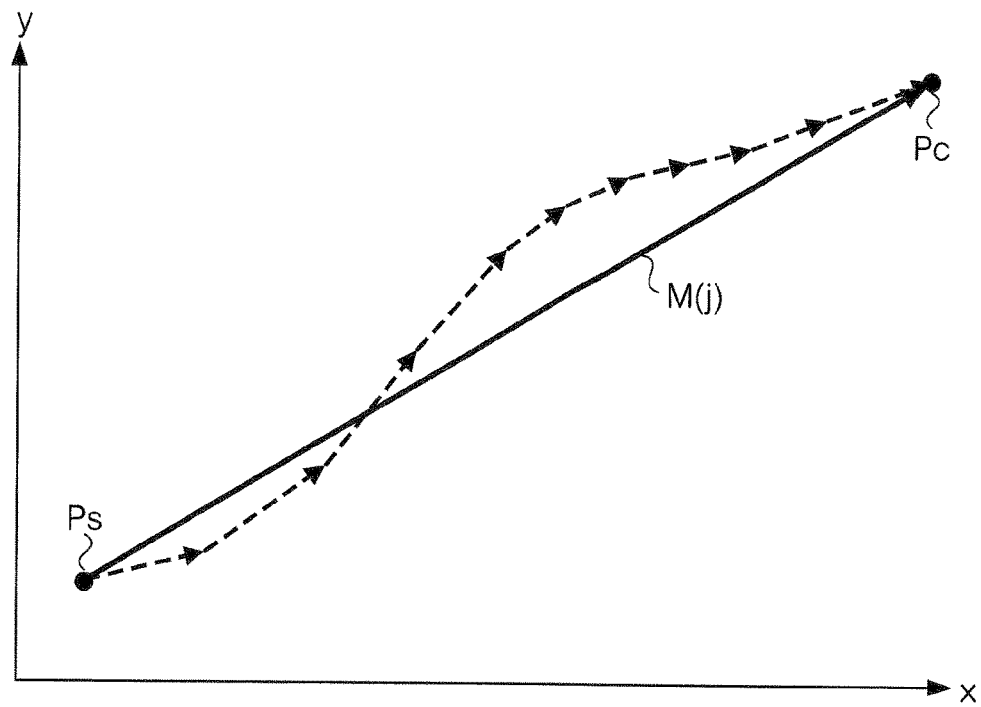
FIG. 10 shows examples of starting point Ps and terminal point Pc.

FIG. 10 is a graph illustrating examples of starting point Ps and terminal point Pc. The operational inputs in each frame shown in FIG. 10 are the same as those shown in FIG. 9. Vector M(j) is a vector from starting point Ps to terminal point Pc, i.e. M(j)=Σm(j) ("Σ" means a total sum). CPU 101 calculates drag velocity Vd in the j-th frame, i.e. drag velocity Vd(j), in accordance with formula (3) shown below. After calculating drag velocity Vd(j), CPU 101 writes drag velocity Vd(j) to memory 102. Memory 102 stores at least drag velocities in the last two frames, i.e. drag velocity Vd(j) and drag velocity Vd(j−1).

$$Vd(j)=k4\times Vd(j-1)-k5\times M(j) \quad \text{Formula (3):}$$

Coefficient k4 is a coefficient corresponding to virtual resistance against movement of area 53 in virtual space 50, similarly to coefficient k2. Coefficient k4 may be either the same as coefficient k2 or different from coefficient k2. Coefficient k5 is a coefficient determining sensitivity to operational inputs. Coefficient k5 is more than zero, i.e. k5>0. The larger coefficient k5 is, the more sensitive to operational inputs drag velocity Vd is. Namely, if the same operational input is made, the larger coefficient k5 is, the higher drag velocity Vd is.

FIG. 7 is referred to again. In step S104, CPU 101 determines a velocity of movement. In this exemplary embodiment, CPU 101 determines the velocity of movement in accordance with operational inputs made by the user. More concretely, CPU 101 adopts the drag velocity as the velocity of movement of area 53 when touch screen 202 is touched in the latest frame, in other words, when a drag is continuing. On the other hand, CPU 101 adopts the inertial velocity as the velocity of movement of area 53 when touch screen 202 is not touched in the latest frame.

Figure 11:
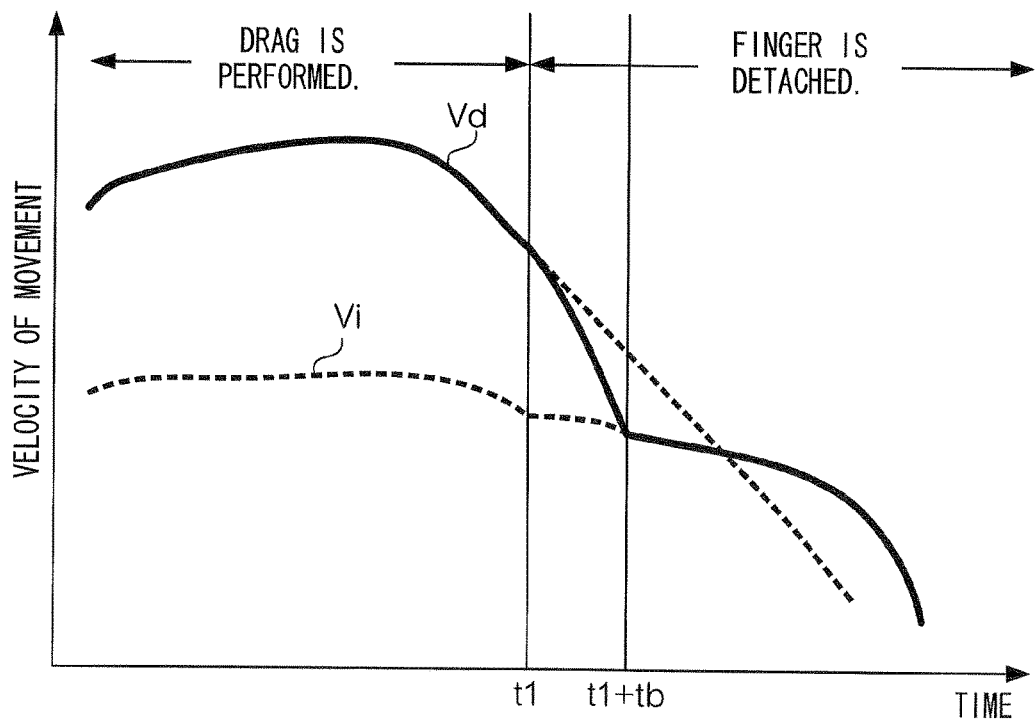
FIG. 11 shows examples of velocities of movement.

FIG. 11 is a graph illustrating examples of velocities of movement. In FIG. 11, horizontal axis indicates time, and vertical axis indicates velocity of movement. In the case shown in FIG. 11, the user continues a drag until time t1, he/she detaches his/her finger from touch screen 202 at time t1, and he/she keeps his/her finger detached from touch screen 202. Please note that FIG. 11 shows a case where area 53 does not go outside freely-movable portion 54. In FIG. 11, the dashed lines indicate velocities that are calculated and not adopted as the velocities of movement, and the solid line indicates velocities that are adopted as the velocities of movement. While the drag is continuing, drag velocities Vd are adopted as the velocities of movement, and after the finger is detached, inertial velocities Vi are adopted as the velocities of movement. At the time the finger is detached from touch screen 202, i.e. at time t1, drag velocity Vd and inertial velocity Vi are necessarily identical to each other. Accordingly, if the velocity of movement is switched from drag velocity Vd to inertial velocity Vi at time t1, the velocity of movement may change discontinuously. To avoid such discontinuous change of the velocity of movement, in this exemplary embodiment, CPU 101 interpolates between the drag velocity and the inertial velocity for a certain period of time after the finger is detached, i.e. during time period tb, so that the velocity of movement changes continuously from drag velocity Vd to inertial velocity Vi. More concretely, the coefficient multiplying drag velocity Vd is changed, for example linearly, from 100% to 0%, and the coefficient multiplying inertial velocity Vi is changed, for example linearly, from 0% to 100%, during time period tb. A sum of the drag velocity multiplied by the former coefficient and the inertial velocity multiplied by the latter coefficient is used as the velocity of movement. The interpolation is an optional process.

FIG. 7 is referred to again. In step S105, CPU 101 calculates a position (more precisely a candidate of a position) of area 53 after movement. The calculation of the position after movement is performed based on the current position of area 53, the velocity of movement, and the length of frame. The position of area 53 is specified by the position of a particular point in area 53 such as the upper left corner point of area 53.

In step S106, CPU 101 judges whether the position of area 53 after movement goes outside freely-movable portion 54. In a case where CPU 101 judges that the position goes outside freely-movable portion 54 (S106: Yes), CPU 101 goes to step S107. In a case where CPU 101 judges that the position does not go outside freely-movable portion 54 (S106: No), CPU 101 goes to step S108.

In step S107, CPU 101 calculates an acceptable volume of intrusion, i.e. an upper threshold of volume of intrusion. In this exemplary embodiment, CPU 101 calculates the acceptable volume of intrusion based on the velocity of movement. More concretely, the higher the velocity of movement is, the larger the acceptable volume of intrusion is calculated to be.

Figure 12:
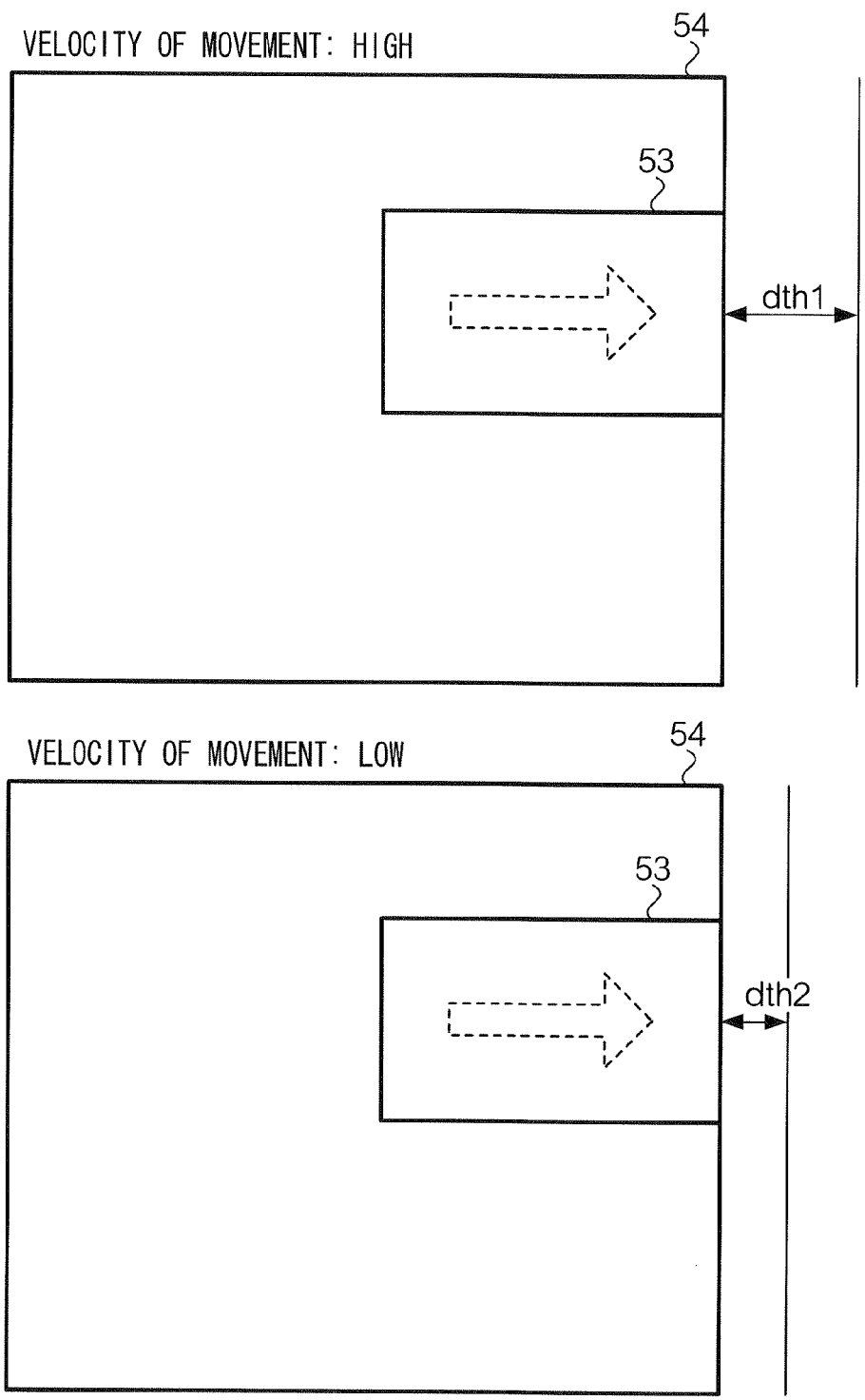
FIG. 12 shows examples of calculated threshold.

FIG. 12 is a diagram illustrating examples of calculated acceptable volume of intrusion. Upper diagram of FIG. 12 shows acceptable volume of intrusion dth1 when the velocity of movement is V1, and lower diagram of FIG. 12 shows acceptable volume of intrusion dth2 when the velocity of movement is V2. When V1 is larger than V2, i.e. V1>V2, dth1 is the same as or larger than dth2, i.e. dth1>=dth2. The flow of process illustrated in FIG. 7 is carried out in each frame, and the acceptable volume of intrusion is calculated and updated in each frame as long as area 53 goes outside freely-movable portion 54.

FIG. 7 is referred to again. CPU 101 writes the calculated acceptable volume of intrusion to memory 102. If the default value of acceptable volume of intrusion stored by memory 102 is, for example, zero, when area 53 stays inside freely-movable portion 54, the acceptable volume of intrusion stored by memory 102 is zero. When at least a part of area 53 is outside freely-movable portion 54, the acceptable volume of intrusion calculated in the frame in which CPU 101 judged that area 53 would go outside freely-movable portion 54 is stored by memory 102. After the calculation of acceptable volume of intrusion, CPU 101 goes to step S108. The acceptable volume of intrusion stored by memory 102 is reset to the default value when the actual volume of intrusion becomes zero.

In step S108, CPU 101 moves area 53 under the condition that the volume of intrusion does not exceed the acceptable volume of intrusion. Detailed processes in step S108 differ in the cases where area 53 stays inside freely-movable portion 54 and when area 53 goes outside freely-movable portion 54. When area 53 stays inside freely-movable portion 54, area 53 can move without any restriction of the acceptable volume of intrusion, since each of the acceptable volume of intrusion and the actual volume of intrusion is zero. CPU 101 writes to memory 102 coordinates indicating a position that CPU 101 calculated in step S105 as coordinates of area 53.

When area 53 goes outside freely-movable portion 54, the movement of area 53 is restricted in accordance with the acceptable volume of intrusion. Namely, CPU 101 writes to memory 102 the coordinates calculated in step S105 as the coordinates of area 53 during the time the volume of intrusion does not exceed the acceptable volume of intrusion, and CPU 101 modifies the coordinates calculated in step S105 so that the volume of intrusion becomes equal to the acceptable volume of intrusion, namely the volume of intrusion is reduced to the acceptable volume of intrusion, during the time the volume of intrusion exceeds the acceptable volume of intrusion. CPU 101 writes the modified coordinates to memory 102 as the coordinates of area 53. As a result, actual velocity of movement at which area 53 moves, as observed by the user, becomes different from the velocity of movement calculated in step S104. In the following explanation, "velocity of movement" means the velocity of movement calculated in step S104, and "observed velocity of movement" means the velocity of movement actually observed by the user. Even during the time when the coordinates of area 53 are modified, the velocity of movement is always calculated in step S104 for each frame.

In step S109, CPU 101 outputs a data set indicating a graphic in area 53, whose position is specified by the coordinates stored by memory 102, to touch screen 202 and instructs touch screen 202 to display the graphic. Touch screen 202 displays the graphic in accordance with the data set received from CPU 101 via communication module 105 and communication module 203. In the following frame, CPU 101 repeats the series of processes in steps S101 to S109 for the frame.

When the user flicks on touch screen 202 under a situation where area 53 stays inside freely-movable portion 54 and area 53 goes outside freely-movable portion 54 in response to the flick, and no further drag or flick is made, the following process is performed. The velocity of movement decreases with time because of effects of coefficients k1 and k2 of formula (1), and the velocity of movement reaches zero. Precisely, the velocity of movement may not reach zero following formula (1), but in this exemplary embodiment, the velocity of movement is modified to become zero over time by, for example, rounding off values of parameters, etc. During the time when area 53 goes outside freely-movable portion 54, the acceptable volume of intrusion is continually updated in each frame based on the velocity of movement in the frame. Since the velocity of movement decreases over time, the acceptable volume of intrusion also decreases over time. The actual volume of intrusion increases over time after it exceeds zero. During the time when the volume of intrusion is less than the acceptable volume of intrusion, the volume of intrusion increases over time. However, after the volume of intrusion reaches the acceptable volume of intrusion, the volume of intrusion is restricted by the acceptable volume of intrusion. Since the acceptable volume of intrusion decreases over time, after the volume of intrusion reaches the acceptable volume of intrusion, the volume of intrusion also decreases over time. As a result, the direction of observed velocity of movement reverses after the volume of intrusion reaches the acceptable volume of intrusion.

FIGS. 13A and 13B show examples of changes of volume of intrusion and observed velocity of movement. In FIG. 13A, the vertical axis indicates volume of intrusion, and in FIG. 13B, the vertical axis indicates observed velocity of movement. In both of the graphs, the horizontal axis indicates time. With regard to the direction of volume of intrusion and velocity of movement, the direction in which area 53 goes from inside to outside freely-movable portion 54 is the positive direction. In the examples shown in FIGS. 13A and 13B, area 53 reaches the edge of freely-movable portion 54 at time t11, and area 53 starts to intrude outside freely-movable portion 54. After time t11, the acceptable volume of intrusion is continuously calculated (step S107). The acceptable volume of intrusion decreases over time, and the actual volume of intrusion increases over time. Then, the actual volume of intrusion becomes equal to the acceptable volume of intrusion at time t12. After time t12, the actual volume of intrusion does not exceed the acceptable volume of intrusion, since the volume of intrusion is modified to become equal to the acceptable volume of intrusion in step S108 when the volume of intrusion calculated in step S105 exceeds the acceptable volume of intrusion. In the displayed screen, the observed velocity of movement reaches zero at time t12 and becomes negative after time t12, and therefore, the user observes that area 53 starts to move in the opposite direction between before time t12 and after time t12. After time t12, the actual volume of intrusion decrease over time, and it reaches zero at t13. In the examples shown in FIGS. 13A and 13B, area 53 stays at the border position of freely-movable portion 54 after time t13. Namely, the observed velocity of movement is zero after time t13. It should be noted that the position where area 53 stops after area 53 changes its direction of movement and moves back to the inside of freely-movable portion 54 is not limited to the border position of freely-movable portion 54. For example, area 53 may be managed to stop at a predetermined point close to the border of freely-movable portion 54.

FIG. 14 is a diagram illustrating examples of acceptable volume of intrusion. The upper portion of FIG. 14 shows acceptable volume of intrusion dmax1 when the velocity of movement is V1. The lower portion of FIG. 14 shows acceptable volume of intrusion dmax2 when the velocity of movement is V2. When velocity of movement V1 is larger than velocity of movement V2, i.e. V1>V2, the acceptable volume of intrusion dmax1 is the same as or more than the acceptable volume of intrusion dmax2, i.e. dmax1>=dmax2.

Figure 15A:
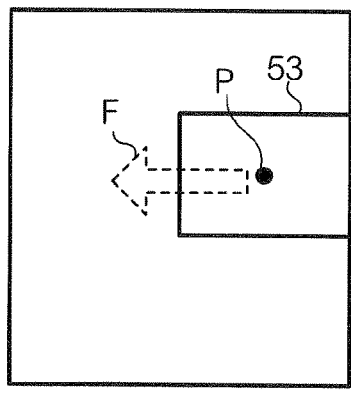
FIGS. 15A-15D show examples of a positional relation between area 53 and freely-movable portion 54.
Figure 15B:
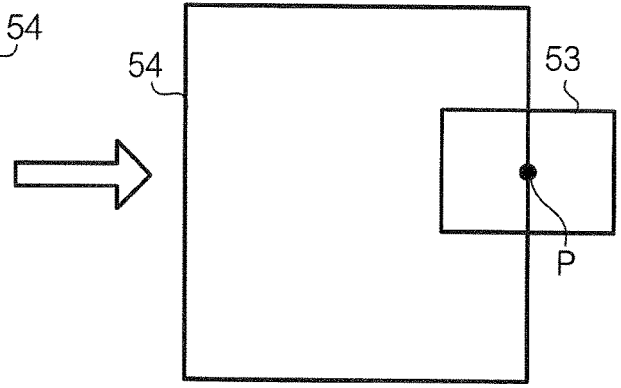
Figure 15C:
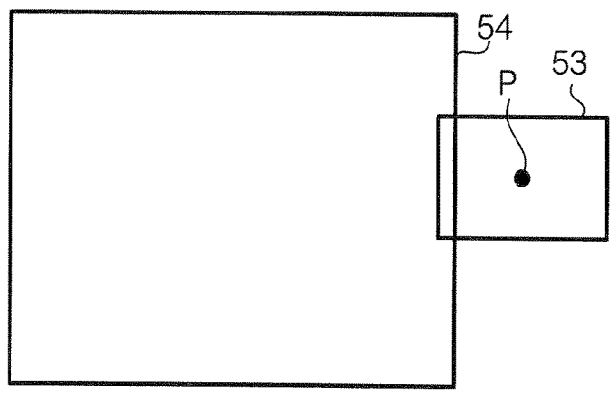
Figure 15D:
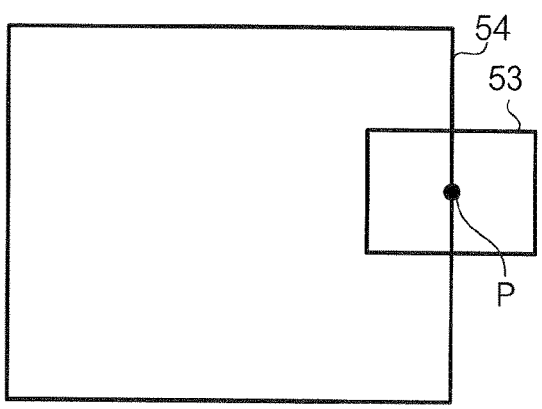

FIGS. 15A-15D show examples of a positional relation between area 53 and freely-movable portion 54. In the situation shown in FIG. 15A, area 53 stays inside freely-movable portion 54. In this situation, it is supposed that the user to flicks on touch screen 202 in the left direction to make an operational input F, and the user does not touch screen 202 and makes no further operational input after the operational input F. In this case, area 53 moves in the right direction, and particular point P of area 53 reaches the right edge of freely-movable portion 54 (FIG. 15B). If the velocity of movement is not zero when particular point P reaches the right edge of freely-movable portion 54, area 53 intrudes outside freely-movable portion 54. When the volume of intrusion reaches the acceptable volume of intrusion (FIG. 15C), the direction of velocity of movement of area 53 reverses, and continues to move in the opposite direction until particular point P of area 53 reaches the right edge of freely-movable portion 54 again, and area 53 stays at the position (FIG. 15D). Alternatively, CPU 101 may manage area 53 to move back inside freely-movable portion 54 to a predetermined position that is more distant from the position corresponding to the acceptable volume of intrusion than a predetermined maximum value. The predetermined maximum value may either be the same as or different from the value of acceptable volume of intrusion. Namely, the predetermined maximum value may be larger than the value of acceptable volume of intrusion.

As explained above, in accordance with the present exemplary embodiment, the user is provided with a comfortable operational feeling when the user moves area 53 near the border of freely-movable portion 54.

4. Modifications

The technology herein should not be limited to the above explained exemplary embodiment, and may be modified in various ways. In the following section, some examples of modifications are explained. It should be noted that two or more of the following examples of modifications may be combined.

4-1. Modified Example 1

The method of determining the velocity of movement should not be limited to the method used in the above explained exemplary embodiment. For example, the velocity of movement may be selected in accordance with operational inputs made by the user from among inertial velocity Vi, drag velocity Vd, and a third velocity calculated in accordance with another formula. The velocity of movement also may be calculated without a selection from among plural velocities. More concretely, for example, one of inertial velocity Vi and drag velocity Vd may be always adopted as the velocity of movement without depending on the operational input made by the user. In such a case, CPU 101 does not necessarily calculate inertial velocity Vi or drag velocity Vd that is not used.

Moreover, the method of calculating the inertial velocity and the drag velocity should not be limited to the method used in the above-explained exemplary embodiment. For example, the inertial velocity may be calculated based on operational inputs made in the last predetermined number of frames after the currently continuing drag started, instead of all of operational inputs made in the frames after the currently continuing drag started.

4-2. Modified Example 2

The definition of distance between area 53 and freely-movable portion 54 should not be limited to the definition used in the above-explained exemplary embodiment. For example, the distance between area 53 and freely-movable portion 54 may be defined as the distance between any particular point of area 53 and any particular point of freely-movable portion 54. The particular points of area 53 and freely-movable portion 54 may be, for example, their center of gravity, one of their vertexes, a predetermined point on a predetermined side of them, etc.

4-3. Modified Example 3

The definition of acceptable volume of intrusion, i.e. the upper threshold of distance between area 53 and freely-movable portion 54, should not be limited to the definition used in the above-explained exemplary embodiment. For example, a constant value is set as the acceptable volume of intrusion without changing it depending on the velocity of movement. The acceptable volume of intrusion also may be determined based on any parameters other than the velocity of movement.

4-4. Modified Example 4

The relation between operational inputs and directions of movement of area 53 should not be limited to the relation used in the above-explained exemplary embodiment. For example, CPU 101 may determine the velocity of movement in the same direction as that of drag or flick made by the user.

4-5. Modified Example 5

The hardware configurations of information-processing device 1 or the other devices should not be limited to the hardware configurations used in the above explained exemplary embodiment. For example, controller 2 may not be provided with touch screen 202. In the case, controller 2 may have a keypad and/or buttons, and provide information-processing device 1 with operational input data indicating key or button that is pressed down by the user. For example, controller 2 may an acceleration sensor, and provide information-processing device 1 with operational input data indicating a sensed acceleration, i.e. indicating an action made to controller 2, such as swinging controller 2 around, by the user.

4-6. Modified Example 6

The process of determining the volume of intrusion after area 53 goes beyond the border of freely-movable portion 54 should not be limited to the process used in the above explained exemplary embodiment. For example, the following process may be adopted instead of the process explained in the above exemplary embodiment. In this modified example, the acceptable volume of intrusion is determined based on the velocity of movement at the timing when area 53 goes beyond the border of freely-movable portion 54.

The acceptable volume of intrusion is not updated until area 53 moves back inside freely-movable portion 54, and during the time when area 53 goes outside freely-movable portion 54, a constant value is used as the acceptable volume of intrusion. When area 53 goes beyond the border of freely-movable portion 54, a virtual operational input is generated, and the virtual operational input moves area 53 back to freely-movable portion 54. The virtual operational input is, for example, an operational input whereby a force is added to area 53 in the direction opposite to the direction of intrusion, and the strength of the force is proportional to the volume of intrusion like a force made by a spring. During the time when area 53 goes outside freely-movable portion 54, the virtual operational input is used to calculate the inertial velocity in accordance with formula (1). Because of the virtual operational input, the direction of movement of area 53 reverses and area 53 moves back inside freely-movable portion 54.

4-7. Modified Example 7

The flow of process executed by information-processing device 1, the parameters and the formulas used in each component of the process, etc., used in the exemplary embodiment are examples, and they do not limit the technology herein. For example, some of steps shown in the flowchart of FIG. 7 may be skipped, or their order changed, etc.

4-8. Modified Example 8

Area 53 should not be limited to a part of virtual space. Area 53 may be a part of a real space.

4-9. Other Modified Examples

Information-processing device 1 should not be limited to a stationary type of gaming device. Information-processing device 1 may be any type of information-processing device other than a gaming device, such as a mobile gaming device, a personal computer, a mobile phone, PDA (Personal Digital Assistants), a tablet type terminal device, etc. The application program executed in information-processing device 1 should not be limited to a gaming application program. Any application program other than a gaming application program such as a text-editing application program, a lesson-providing application, etc., may be executed in information-processing device 1. Moreover, a part of functions provided by information-processing device 1 explained in the above exemplary embodiment may be provided by a server device that communicates with information-processing device 1 via a network. In such a case, an information-processing system that has the server device and information-processing device 1 provides the functions explained in the exemplary embodiment.

The application program that is executed by information-processing device 1 should not be limited for distribution to a user to being stored in a computer-readable non-transitory recording medium. The application program may be distributed to the user by being downloaded to the user's information-processing device via a network such as the Internet. Similarly, the system software of information-processing device 1 may be provided stored in a computer-readable non-transitory recording medium or may be downloaded to the information-processing device of the user.

What is claimed is:

1. An information-processing device comprising at least one processor and a memory comprising instructions, the instructions being executable by the at least one processor to at least:

receive an operational input made by a user for moving a display area that has an area that overlaps with a predetermined area, control a display to display a graphic in the display area, without displaying anything outside of the display area on the display, determine a velocity of movement of the display area in accordance with a value derived from the operational input, determine a threshold for a distance between the display area and a predetermined portion of the predetermined area based on the velocity of movement, and manage the display area to move at the velocity of movement under a condition that, when a portion of the display area moves from inside towards outside of the predetermined area, the distance between the display area and the predetermined portion does not exceed the threshold.

wherein the distance between the display area and the predetermined portion is a distance between a particular point of the display area and a point at a an edge of the predetermined area.

2. The information-processing device according to claim 1, wherein the instructions are further executable by the at least one processor to determine the threshold such that the higher the velocity of movement is, the larger the threshold is.

3. The information-processing device according to claim 1, wherein the instructions are further executable by the at least one processor to manage the display area to move in a direction such that a portion of the display area moves from inside towards outside of the predetermined portion.

4. The information-processing device according to claim 1, wherein the instructions are further executable by the at least one processor to manage the display area such that the velocity of movement becomes zero before the distance reaches the threshold.

5. The information-processing device according to claim 4, wherein the instructions are further executable by the at least one processor to manage the display area such that the display area moves back to a position where no portion of the display area is outside the predetermined portion, after the velocity of movement becomes zero.

6. The information-processing device according to claim 5, wherein the instructions are further executable by the at least one processor to manage the display area such that the display area moves back to a position close to a border of the predetermined portion.

7. The information-processing device according to claim 4, wherein the instructions are further executable by the at least one processor to manage the display area such that the velocity of movement becomes zero before the distance reaches the threshold under a condition that the operational input for moving the display area outside the predetermined portion is being received.

8. The information-processing device according to claim 1, wherein the instructions are further executable by the at least one processor to determine repeatedly the threshold based on an updated value of the velocity of movement.

9. The information-processing device according to claim 1, wherein the instructions are further executable by the at least one processor to manage the display area such that the display area moves at a velocity of movement that decreases over a time period during which the operation receiver receives no operational input.

10. The information-processing device according to claim 1, wherein
the instructions are further executable by the at least one processor, such that when a position of the display area after a movement at the velocity of movement moves outside the predetermined portion, the position of the display area is modified such that the display area stays in the predetermined portion.

11. The information-processing device according to claim 10, wherein
the instructions are further executable by the at least one processor to determine the velocity of movement of the display area regardless of the position of the display area that is modified.

12. The information-processing device according to claim 1, wherein the particular point of the display area is a center point of the display area.

13. The information-processing device according to claim 1, wherein the particular point of the display area is a point at an edge of the display area.

14. The information-processing device according to claim 1, wherein
the instructions are further executable by the at least one processor to determine a first velocity as the velocity of movement based on a total sum of values derived from operational inputs received by the operation receiver in a predetermined period.

15. The information-processing device according to claim 14, wherein
the instructions are further executable by the at least one processor such that, when a new velocity of movement is determined, the total sum of values in accordance with operational inputs is decreased, and a new value is added to the decreased total sum in accordance with an operational input newly received by the operation receiver to generate a new total sum of values, and determines the first velocity based on the new total sum of values as the new velocity of movement.

16. The information-processing device according to claim 14, wherein
the predetermined area is an n-dimensional (n >=1) virtual space, and
the instructions are further executable by the at least one processor to determine a second velocity as the velocity of movement based on a distance between a first point and a second point in the n-dimensional virtual space, each of which points is indicated by an operational input received by the operation receiver.

17. The information-processing device according to claim 16, wherein
the instructions are further executable by the at least one processor to determine one of the first velocity and the second velocity as the velocity of movement in accordance with an operational input received by the operation receiver.

18. The information-processing device according to claim 17, wherein
the instructions are further executable by the at least one processor to determine the second velocity as the velocity of movement during a period in which operational inputs are continually received by the operation receiver, and determine the first velocity as the velocity of movement during a period in which no operational input is received by the operation receiver.

19. The information-processing device according to claim 1, wherein the predetermined area is a virtual space.

20. The information-processing device according to claim 1, wherein the instructions are executable by the at least one processor to dynamically control the display area to move at a changing velocity of movement under the condition.

21. A computer-readable non-transitory storage medium storing a program causing a computer device to execute a process, the process comprising:
receiving an operational input made by a user for moving a display area that has an area that overlaps with a predetermined area,
controlling a display to display a graphic in the display area, without displaying anything outside of the display area on the display,
determining a velocity of movement of the display in accordance with a value derived from the operational input,
determining a threshold for a distance between the display area and a predetermined portion of the predetermined area based on the velocity of movement, and
managing the display area to move the display area at the velocity of movement under a condition that, when a portion of the display area moves from inside towards outside of the predetermined portion of the predetermined area, the distance between the display area and the predetermined portion does not exceed the threshold,
wherein the distance between the display area and the predetermined portion is a distance between a particular point of the display area and appoint at an edge of the predetermined area.

22. The computer-readable non-transitory storage medium according to claim 21, wherein
the process further comprises managing the display area such that the velocity of movement becomes zero before the distance reaches the threshold under a condition that the operational input for moving the display area outside the predetermined portion is being received.

23. The computer-readable non-transitory storage medium according to claim 20, wherein the process further comprises dynamically controlling the display area to move at a changing velocity of movement under the condition.

24. An information-processing method comprising:
receiving an operational input made by a user for moving a display area that has an area that overlaps with a predetermined area,
controlling a display to display a graphic in the display area, without displaying anything outside of the display area on the display,
determining a velocity of movement of the display area based on a value in accordance with the operational input,
determining a threshold for a distance between the display area and a predetermined portion of the predetermined area based on the velocity of movement, and
managing the display area to move the display area at the velocity of movement under a condition that, when a portion of the display area moves from inside towards outside of the predetermined portion of the predetermined area, the distance between the display area and the predetermined portion does not exceed the threshold, wherein the distance between the display area and the predetermined portion is a distance between a particular point of the display area and a point at an edge of the predetermined area.

25. The information-processing method according to claim 24, further comprising
managing the display area such that the velocity of movement becomes zero before the distance reaches the threshold under a condition that the operational input for moving the display area outside the predetermined portion is being received.

26. The information-processing method according to claim 24, further comprising:
dynamically controlling the display area to move at a changing velocity of movement under the condition.

27. An information-processing system, comprising a display, a memory and a processing system including at least a processor, the processing system being configured at least to:
receive an operational input made by a user for moving a display area that has an area that overlaps with a predetermined area,
control the display to display a graphic in the display area, without displaying anything outside of the display area on the display,
determine a velocity of movement of the display area based on a value in accordance with the operational input,
determine a threshold for a distance between the display area and a predetermined portion of the predetermined area based on the velocity of movement, and
manage the display area to move the display area at the velocity of movement under a condition that, when a portion of the display area moves from inside towards outside of the predetermined area, the distance between the display area and the predetermined portion does not exceed the threshold,
wherein the distance between the display area and the predetermined portion is a distance between a particular point of the display area and a point at an edge of the predetermined area.

28. The information-processing system according to claim 27, wherein
the processing system is further configured to manage the display area such that the velocity of movement becomes zero before the distance reaches the threshold under a condition that the operational input for moving the display area outside the predetermined area is being received.

29. The information-processing system according to claim 27, wherein the processing system is further configured to dynamically control the display area to move at a changing velocity of movement under the condition.

30. An information-processing device comprising at least one processor and a memory comprising instructions, the instructions being executable by the at least one processor to at least:
receive an operational input made by a user for moving a display area that has an area that overlaps with a predetermined area,
control a display to display a graphic in the display area,
determine a velocity of movement of the display area in accordance with a value derived from the operational input,
determine a threshold for a distance between the display area and a predetermined portion of the predetermined area based on the velocity of movement, and
adjust the velocity of movement of the display area under a condition that, when a portion of the display area moves outside of the predetermined area, the distance between the display area and the predetermined portion does not exceed the threshold corresponding to the velocity of movement of the display area,
wherein the distance between the display area and the predetermined portion is a distance between a particular point of the display area and a point at an edge of the predetermined area.

* * * * *